US008683851B2

(12) United States Patent
McCarvill

(10) Patent No.: US 8,683,851 B2
(45) Date of Patent: Apr. 1, 2014

(54) DEVICE FOR MONITORING MACHINE INTERIOR

(75) Inventor: John Roger McCarvill, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 457 days.

(21) Appl. No.: 12/948,408

(22) Filed: Nov. 17, 2010

(65) Prior Publication Data

US 2012/0118111 A1 May 17, 2012

(51) Int. Cl.
*G01M 15/14* (2006.01)

(52) U.S. Cl.
USPC .......... 73/112.01

(58) Field of Classification Search
USPC .......... 73/114.16, 114.18, 114.19, 114.28, 73/114.29, 114.77, 112.01, 112.03
See application file for complete search history.

(56) References Cited

U.S. PATENT DOCUMENTS

| | | | | | |
|---|---|---|---|---|---|
| 3,690,775 | A * | 9/1972 | Cousins | 356/241.4 |
| 3,779,081 | A * | 12/1973 | Holtzman | 73/744 |
| 3,820,386 | A * | 6/1974 | Grikscheit et al. | 3/114.28 |
| 3,889,528 | A * | 6/1975 | Grikscheit et al. | 73/114.28 |
| 4,194,400 | A * | 3/1980 | Staff | 73/623 |
| 4,296,629 | A * | 10/1981 | Vuyovich | 73/114.28 |
| 4,661,695 | A * | 4/1987 | Mori et al. | 250/227.11 |
| 4,753,109 | A * | 6/1988 | Zabler | 73/114.18 |
| 4,815,276 | A * | 3/1989 | Hansel et al. | 60/803 |
| 4,958,515 | A * | 9/1990 | Bruggen et al. | 73/114.19 |
| 5,079,910 | A * | 1/1992 | Hirst et al. | 60/803 |
| 5,115,636 | A * | 5/1992 | Zeiser | 60/803 |
| 5,594,665 | A * | 1/1997 | Walter et al. | 700/301 |
| 5,612,497 | A * | 3/1997 | Walter et al. | 73/756 |
| 5,814,724 | A * | 9/1998 | Romkee | 73/114.77 |
| 5,900,541 | A * | 5/1999 | Morris | 73/114.16 |
| 7,555,932 | B2 * | 7/2009 | Hirose et al. | 73/35.12 |
| 7,581,520 | B2 * | 9/2009 | Kern et al. | 123/145 A |
| 7,866,234 | B2 * | 1/2011 | Smart et al. | 81/57.3 |
| 8,246,298 | B2 * | 8/2012 | Wilson | 415/116 |
| 2006/0291998 | A1 * | 12/2006 | Dube et al. | 415/118 |
| 2008/0121021 | A1 * | 5/2008 | Barke et al. | 73/40 |
| 2009/0126472 | A1 * | 5/2009 | Hirose et al. | 73/114.18 |
| 2010/0011847 | A1 * | 1/2010 | Slivon et al. | 73/114.18 |
| 2010/0077844 | A1 * | 4/2010 | Mori et al. | 73/114.18 |
| 2010/0171956 | A1 * | 7/2010 | Sappey et al. | 356/432 |
| 2010/0215477 | A1 * | 8/2010 | Wilson | 415/118 |

OTHER PUBLICATIONS

McCall, Office Action Communication for U.S. Appl. No. 12/948,391 dated Nov. 1, 2013, (GEEN-01888), 17 pages.

* cited by examiner

*Primary Examiner* — Eric S McCall
(74) *Attorney, Agent, or Firm* — Hoffman Warnick LLP; Ernest G. Cusick

(57) ABSTRACT

A strategically located device and a machine including such a device are disclosed herein. In an embodiment, the device comprises a tool removably affixed to an external casing of the machine. The external casing of the machine includes an access port therethrough for providing access to an interior of the machine; and the tool is inserted into a desired location in the interior of the machine through the access port.

17 Claims, 3 Drawing Sheets

DEVICE FOR MONITORING MACHINE INTERIOR

CROSS REFERENCE TO RELATED APPLICATION

This patent application is related to commonly-assigned U.S. patent application Ser. No. 12/948,391, filed concurrently with this application.

BACKGROUND OF THE INVENTION

The invention relates generally to machines having an external casing. More particularly, the invention relates to inspection, repair or maintenance of machines having an external casing, with minimal to no disassembly of the machine or casing.

Many types of industrial machines such as turbines, include critical components which are encased within an external casing or shell. During the life cycle of a machine, these critical components require inspection, repair, or maintenance in order to maximize the lifespan of the parts and the machine as a whole. Traditionally, access to components for inspection, repair or maintenance has been obtained by removing the casing and disassembling the machine as needed. This process can be technically difficult, time consuming, labor intensive, and expensive. Disassembly of the machine incurs costs both in labor required to disassemble the machine and casing, and in non-productive down time for the machine. Disassembly of the casing of the machine also exposes moving parts of the machine, creating a potential hazard for operators.

BRIEF DESCRIPTION OF THE INVENTION

Described herein are a technique and a device for inspecting and repairing internal components of a machine having an external casing, via an access port in the casing, without removing the casing or disassembling the machine.

A first aspect of the disclosure provides a device for monitoring a machine, the device comprising: a tool removably affixed to an external casing of the machine. The external casing of the machine includes an access port therethrough for providing access to an interior of the machine; and the tool is inserted into a strategic location in the interior of the machine through the access port.

A second aspect of the disclosure provides a machine, the machine including an external casing including an access port therethrough for providing access to a strategic location in an interior of the machine; and a tool removably affixed to the external casing of the machine adjacent to the access port, wherein the tool is inserted into the interior of the machine through the access port.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

At least one embodiment of the present invention is described below in reference to its application in connection with the operation of a turbomachine. Although embodiments of the invention are illustrated and described relative to a turbomachine in the form of a gas turbine, it is understood that the teachings are equally applicable to turbomachines and electric machines including, but not limited to, other types of turbines including steam turbines, wind turbines, wind turbine gear boxes, generators, aircraft engines, reciprocating engines, appliances, accessory bases, locomotive power train machines, healthcare machines such as MRI, CT, and x-ray machines, hydro turbine machines, electric motors, pumps, transformers, switchgears, and generator excitation equipment. Further, at least one embodiment of the present invention is described below in reference to a nominal size and including a set of nominal dimensions. However, it should be apparent to those skilled in the art that the present invention is likewise applicable to any suitable turbomachine and/or electric machine having an outer casing. Further, it should be apparent to those skilled in the art that the present invention is likewise applicable to various scales of the nominal size and/or nominal dimensions.

As indicated above, aspects of the invention provide a device 23 for monitoring a machine 12, as shown in FIGS. 1-5. In one embodiment, device 23, shown in FIG. 4, includes a tool 24 and is removably affixed to an external casing 16 of the machine 12, shown in FIGS. 1-2.

Figure 1:
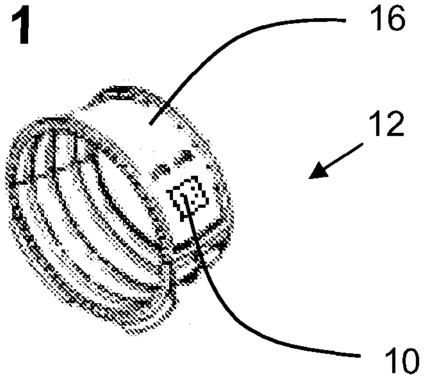
FIG. 1 shows an assembled view of an access port in a machine external casing according to an embodiment of the invention.
Figure 2:
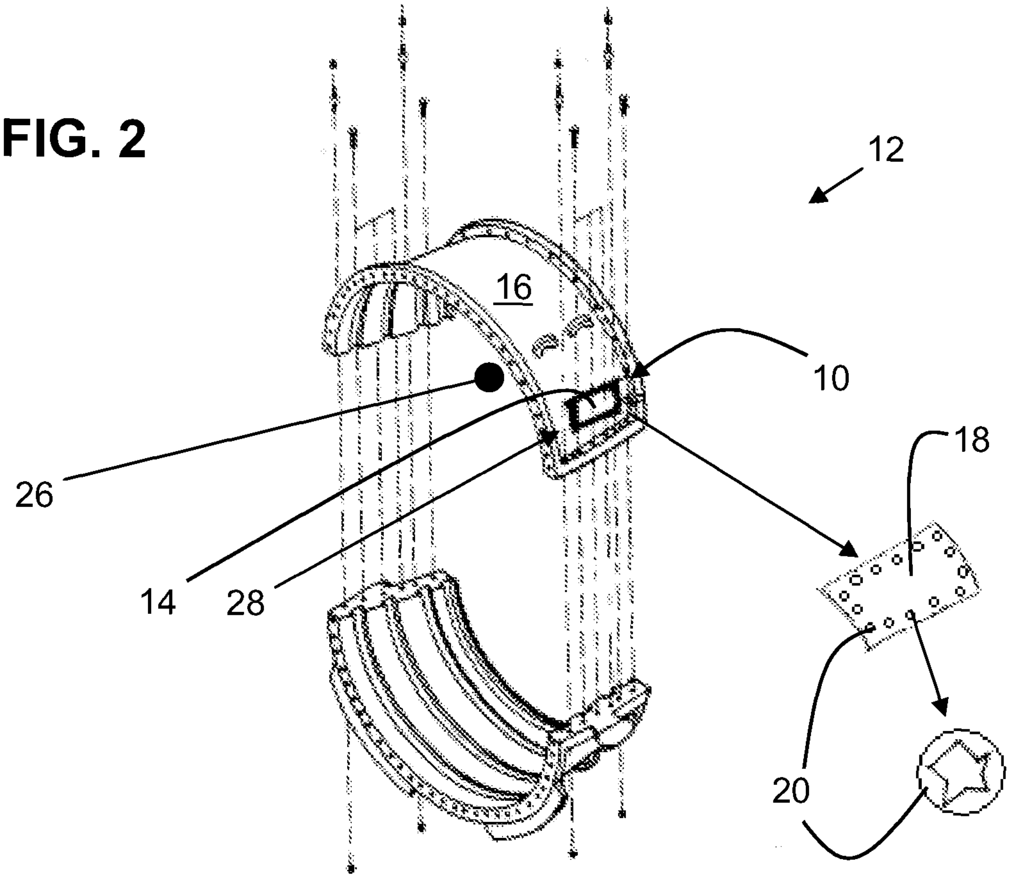
FIG. 2 shows an exploded view of an access port in a machine external casing according to an embodiment of the invention.

As shown in FIGS. 1-2, external casing 16 may include an access port 10 therethrough for providing access to an interior of machine 12. Access port 10 may include a passageway 14 through external casing 16 of machine 12. Access port 10 may further include a removable passageway cover 18 for removably occluding passageway 14. Passageway cover 18 (FIGS. 2-3) may be removed to gain access to an interior of machine 12, and may be replaced in passageway 14 in order to seal casing 16 of machine 12 when access is not required, and/or a seal on casing 16 is required.

Figure 3:
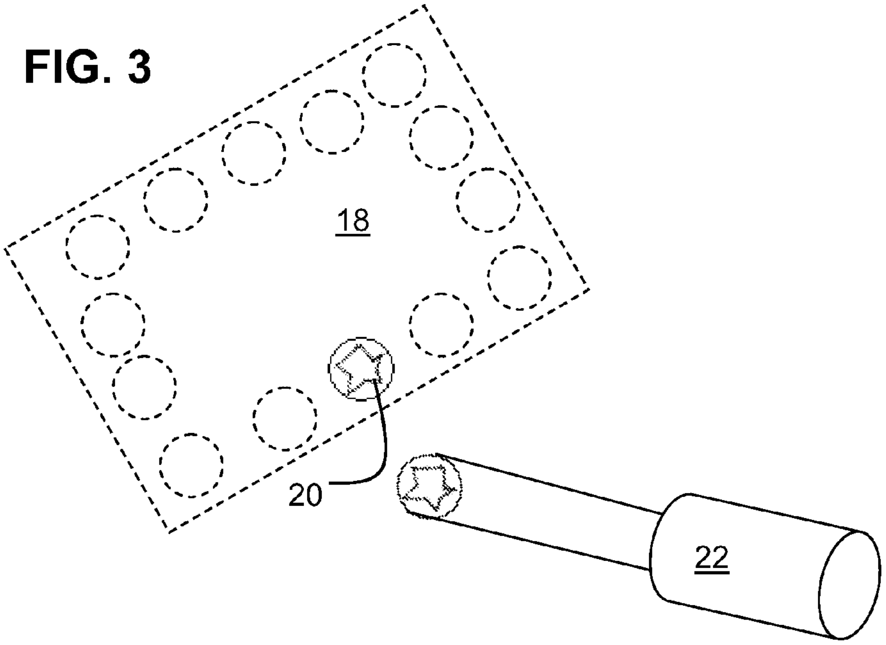
FIG. 3 depicts an access port cover in accordance with an embodiment of the invention.

As shown in FIGS. 2-3, removable cover 18 may be secured to casing 16 of machine 12 by at least one fastener 20. In an embodiment, a plurality of fasteners 20 may line the periphery of cover 18, however, various other arrangements of fasteners 20 are also possible. In one embodiment, fastener 20 may be a bolt. In further embodiments, fastener 20 may be keyed such that a mated tool 22 having a unique and non-standard size and shape, shown in FIG. 3, is required to insert, tighten, loosen and remove fasteners 20 from cover 18 and casing 16. Tool 22 may further be unique to a specific machine, to a specific class of machine, or to a specific type of machine.

The placement, size, shape, and orientation of passageway 14 may vary widely, dependent upon the type of machine 12, the specific class within the type of machine 12, and the various engineering requirements appurtenant thereto.

Regardless of the specific location, size, shape, and orientation of passageway 14 relative to the external casing 16, passageway 14 may be placed to provide access to a desired location 26 on the interior of the machine 12 while external casing 16 is in place. In one embodiment, machine 12 may be built and designed including an access port 10 that is original to machine 12. In another embodiment, an access port 10 may be created in an existing machine 12, thus retrofitting machine 12 with an access port 10 at a strategic location 28.

The strategic location 28 for access port 10 may be determined based on engineering requirements to provide access to a desired location 26 on the interior of machine 12. The engineering requirements may include the feasibility of identifying a continuous path between access port 10 and the desired location 26. A machine 12 may have a single access port 10 or may have several access ports 10, providing access to one or more desired locations 26 on an interior of machine 12.

In various embodiments, the strategic location 28 on machine 12 for access port 10 may be selected according to various requirements of machine 12. Access port 10 may be positioned to afford access to a desired location 26 on an interior of machine 12, where the desired location 26 is a location known to have one of an inspection requirement, a repair requirement, or both. Identification of a desired location 26 may be based on product service feedback and data for the same or similar model machine 12, such that a desired location 26 may be a location where issues and/or problems have been reported, and/or repair work has been required. Identification of a strategic location 28 will be largely dictated by engineering requirements for providing access to desired location 26 through casing 16.

Figure 4:
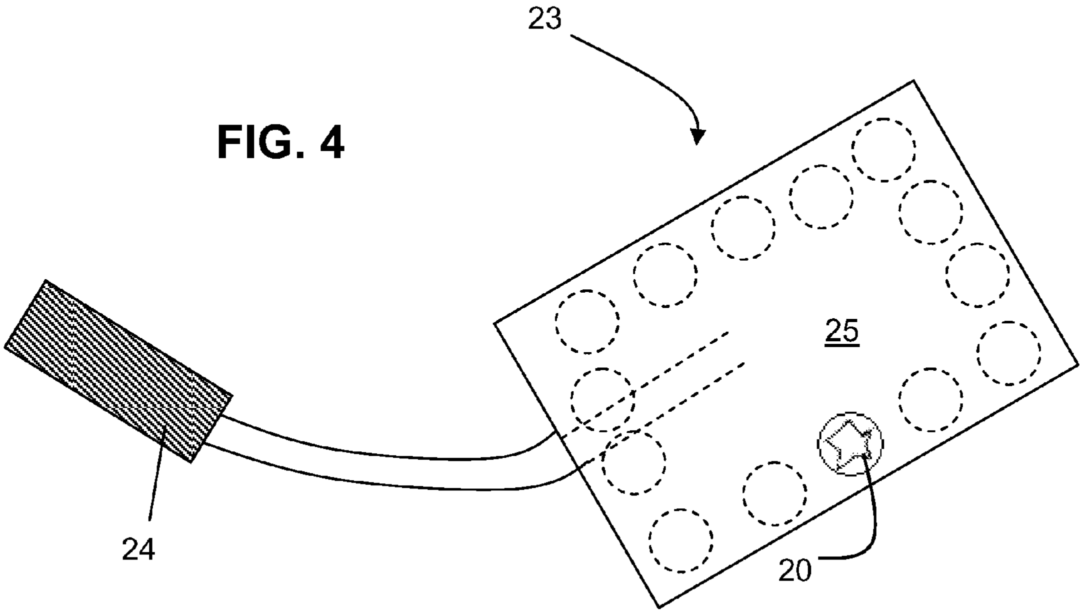
FIG. 4 depicts a device in accordance with an embodiment of the invention.

Returning to device 23, pictured in FIG. 4, device 23 may include a tool insert 24, which is insertable into access port 10. Tool insert 24 may be sized and dimensioned such that it may be inserted into access port 10 when removable passageway cover 18 is removed. Device 23 may further be secured to external casing 16 of machine 12 by at least one fastener 20. Thus, when machine 12 requires inspection, repair or maintenance at desired location 26, cover 18 may be removed from passageway 14 using tool 22, and tool insert 24 may be inserted into passageway 14 and, if desired, device 23 may be affixed to casing 16 using fasteners 20 and tool 22.

Depending upon the inspection or repair task to be completed, device 23 may include a number of different types of tools 24 for inspection, repair or maintenance. Devices 23 including varied tools 24 are designed to be interchangeable with removable cover 18 as well as other devices 23 including tools 24, so that the same access port 10 may be used in furtherance of a variety of inspection and repair tasks. In an embodiment, device 23 is affixed to device cover 25, which may have a shape and a dimension that are substantially similar to that of removable cover 18, such that when removable cover 18 is removed, device cover 25 is sealably inserted into the access port 10 using fasteners 20.

Tool 24 may be capable of locomotion within machine 12, allowing access port 10 to be some distance from desired location 26. In one embodiment, machine 12 is a turbomachine, and tool 24 has a range of motion spanning up to three stages in each of a forward and an aft direction from access port 10. In another embodiment machine 12 is a turbomachine, and tool 24 has a range of motion spanning greater than three stages in each of a forward and aft direction from access port 10. Tool 24 may include a robotic member to facilitate such locomotion.

Turning to tool insert 24 itself, in one embodiment, tool 24 may be an inspection tool such as a measurement device for measuring at least one operating parameter. Such operating parameters may include, but are not limited to: a displacement of a component, a temperature, a clearance gap between, e.g., a stationary component and a rotating component, a pressure, a magnetic flux, a capacitance, a surface finish of a component or components, and a vibration. In a further embodiment, the inspection tool may be a visual inspection tool, such as a borescope, for performing a visual inspection of a component. In still further embodiments, the inspection tool may be a testing tool for testing for a presence of a deposit on a component. Inspection tool may transmit inspection data to computing device 30 using a wired or wireless data communication protocol. In various embodiments, the inspection tool may be operable to carry out an inspection either while the machine is in operation or while the machine is offline. In a further embodiment, device 23 may include a cover 25 with an embeddable tool 24. In such an embodiment, tool 24 may include a sensor that may be embedded in machine 12, and may provide streaming data in real time while machine 12 is in operation. This data may be used in analyses of machine 12 as described further below.

Figure 5:
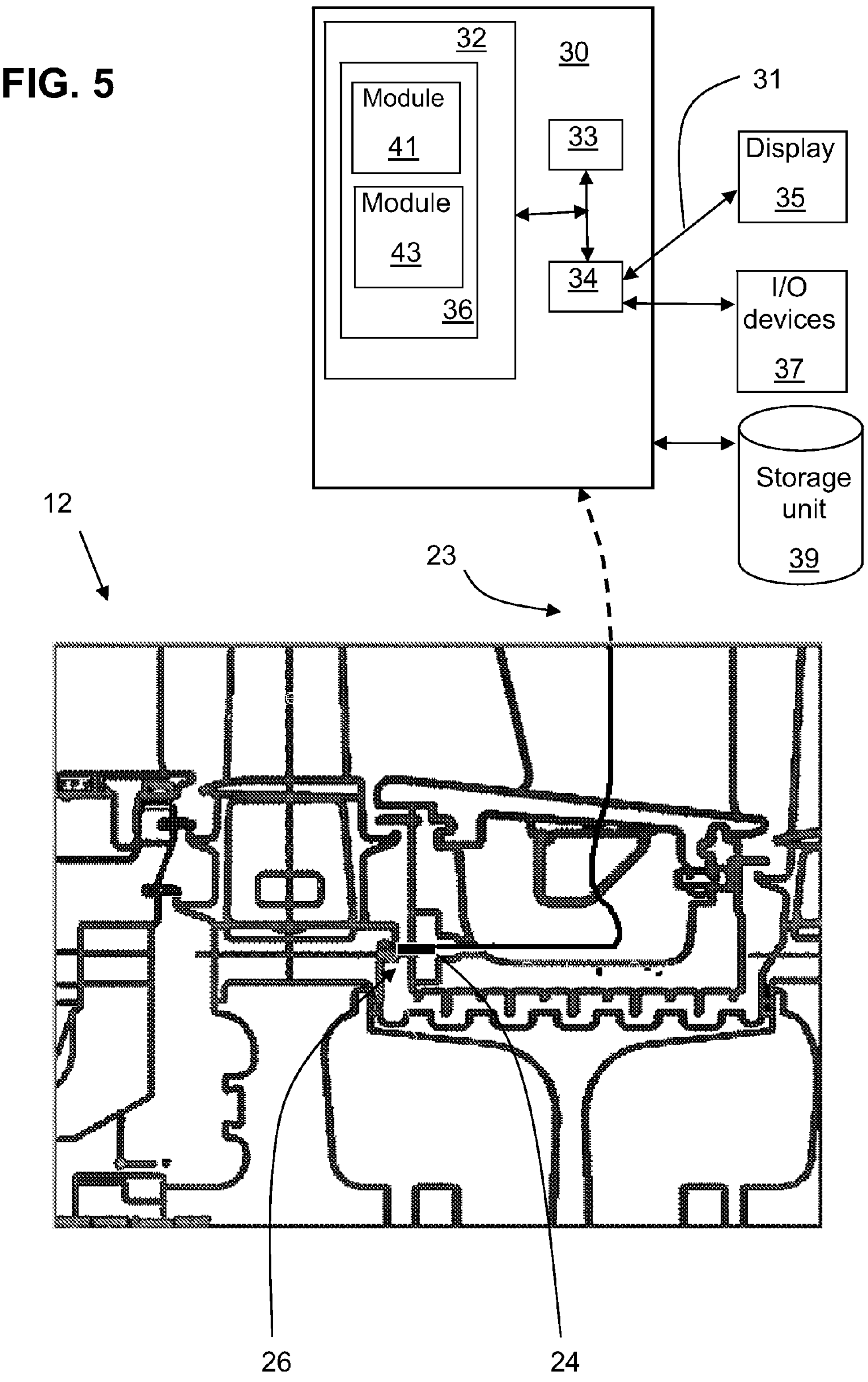
FIG. 5 depicts a cross section view of a device in accordance with embodiments of the invention, as well as a schematic drawing of a computing device in accordance with an embodiment of the invention.

As shown in FIG. 5, computing device 30 includes a processing unit 34, a memory 32, input/output (I/O) interfaces 33 operably connected to one another by pathway 31, which provides a communications link between each of the components in computing device 30. Further, computing device 30 is shown in communication with display 35, external I/O devices/resources 37, and storage unit 39, which may display, store, and manipulate respectively, data obtained by tool 24. I/O devices 37 can comprise one or more human I/O devices, such as a mouse, keyboard, joystick, or other selection device, which enable a human user to interact with computing device 30 and/or one or more communications devices to enable a device user to communicate with computing device 30 using any type of communications link.

In general, processing unit 34 executes computer program product 36 which provides the functions of computing device 30. These modules, including a parameter monitoring module 41 and a down time estimate generator module 43, are stored in memory 32 and/or storage unit 39, and perform the functions and/or steps of the present invention as described herein. Memory 32 and/or storage unit 39 can comprise any combination of various types of computer readable data storage media that reside at one or more physical locations. To this extent, storage unit 39 could include one or more storage devices, such as a magnetic disk drive or an optical disk drive. Still further, it is understood that one or more additional components not shown in FIG. 5 can be included in computing device 30, including analysis of the data captured by tool 24 and transmitted in real time to computing device 30. Additionally, in some embodiments one or more external devices 37, display 35, and/or storage unit 39 could be contained within computing device 30, rather than externally as shown.

Computing device 30 can comprise one or more general purpose computing articles of manufacture capable of executing program code, such as program 36, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, program 36 can be embodied as any combination of system software and/or application software.

Further, program 36 can be implemented using a set of modules 41, 43. In this case, modules 41, 43 can enable computing device 30 to perform a set of tasks used by program 36, and can be separately developed and/or implemented apart from other portions of program 36. As used herein, the term "component" means any configuration of hardware, with or without software, which implements the functionality described in conjunction therewith using any solution, while the term "module" means program code that enables a computing device 30 to implement the actions described in conjunction therewith using any solution. When fixed in memory 32 or storage unit 39 of a computing device 30 that includes a processing unit 34, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computing device 30.

When computing device 30 comprises multiple computing devices, each computing device can have only a portion of program 36 fixed thereon (e.g., one or more modules 41, 43). However, it is understood that computing device 30 and program 36 are only representative of various possible equivalent computer systems that may perform a process described herein. To this extent, in other embodiments, the functionality provided by computing device 30 and program 36 can be at least partially implemented by one or more computing devices that include any combination of general and/or specific purpose hardware with or without program code. In each embodiment, the hardware and program code, if included, can be created using standard engineering and programming techniques, respectively.

Regardless, when computing device 30 includes multiple computing devices, the computing devices can communicate over any type of communications link. Further, while performing a process described herein, computing device 30 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As noted, computing device 30 includes a parameter monitoring module 41 for analyzing data obtained by tool 24. Data from tool 24 provides real-time input for engineering calculations to enable sound decision making with regard to maintenance schedules and inspection, repair, and replacement decisions. In some embodiments, the analysis conducted by parameter monitoring module 41 may include generation of a maintenance schedule for machine 12. In other embodiments, the analysis conducted by module 43 may include estimation of unit down time for repairs of machine 12. In further embodiments, the analysis conducted by parameter monitoring module 41 may include further calculations necessary to make informed repair and replacement decisions. In still further embodiments, analysis of data may include displaying a graphical representation of inspection results as compared to engineering defined design expectations and measurement limits. Said analysis may include tabular comparison, heat map comparisons, in which, for example, green may indicate that a measurement is within specification, yellow may indicate a marginal result, and red may indicate a measurement outside the acceptable range of specifications. It is noted that these embodiments are merely exemplary, and are not intended to limit the disclosure. Further, an operator may directly perform this data analysis, or the data may be automatically analyzed by an algorithm to determine areas of concern.

Analysis provided by modules 41, 43 further provide awareness to operators of machine 12 by supplying real-time operation parameter input, enabling operational adjustments to parameters of machine 12, thereby maximizing component life, maximizing unit operation, and minimize machine down time through further damage to machine 12 which may be inflicted by continuing to operate machine 12 when a given operating parameter has been exceeded.

In addition to monitoring and inspecting machine 12, in another embodiment, tool insert 24 may include a repair tool for performing a repair or maintenance task on a desired location 26 on an interior of machine 12. In one embodiment, desired location 26 for inspection and potential repair via access port 10 may include blades in a compressor of a gas turbine. Compressor blades may fail as a result of blade root failure, foreign objects, or cracks in the blade or root; a non-destructive inspection may provide information about the condition of the blades to inform a decision as to repair needs. Further, access port 10 may facilitate inspection and repairs including compressor blade tip grinding, blade/leading edge inspection and repair, blade fouling deposit testing and cleaning, and tooling to repair or replace damaged or out of life internal components of machine 12.

In another embodiment, throughbolts may be a desired location 26 for inspection or repair. In another embodiment, machine 12 may be a turbine, and the desired location 26 may be a stator exit guide vane. Still other desired locations 26 may include lock wires in any of a number of types of machines 12, and in a hot section of a turbine, the turbine wheel may require inspection and/or repair to ensure that, e.g., dovetail components maintain structural integrity over the course of temperature cycling and use. In another embodiment, in which machine 12 is a turbomachine, tool insert 24 may be a repair tool which may be used to facilitate the radially outward removal of at least one blade and a radially inward insertion of at least one replacement blade through access port 10.

Depending on the location 28 of the access port and the position of the desired location 26 being inspected and/or repaired, inspection and repair may take place either while machine 12 is offline or while machine 12 is in use. In any event, access port 10 may provide the ability to conduct non-destructive inspections and repairs with little to no disassembly of the machine 12 unit, resulting in minimal down time and improved efficiency. Access port 10 may further facilitate the insertion of monitoring devices which may provide data on an ongoing basis as to various operating conditions and parameters.

Technical effects of the various embodiments of the present invention include providing a device for monitoring and inspecting machine 12 and analyzing inspection data, as well as repairing/maintaining a machine 12 having an external casing 16 via a functional access port 10 in casing 16, thus avoiding disassembling casing 16.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A machine comprising:

an external casing including an access port therethrough in a strategic location for providing access to a desired location in an interior of the machine, wherein the access port includes a removable cover for sealably occluding the access port; and a device comprising a tool affixed to an access port device cover, the access port device cover having a shape and a dimension that are substantially similar to that of the removable cover, such that when the removable cover is removed, the access port device cover is inserted into the access port, wherein the access port device cover is sealably affixed to the external casing, and the tool is inserted into the desired location through the access port, wherein the tool is removably affixed to the external casing of the machine by at least one fastener, wherein the at least one fastener further comprises a bolt having a bolt head keyed such that a mated tool of a non-standard size and a non-standard shape is required to remove the bolt; and wherein the access port device cover is interchangeably insertable into the access port with the removable cover and with at least one additional access port device cover comprising at least one other tool.

2. The machine of claim 1, wherein the mated tool is unique to one of an individual machine, a class of machine, and a type of machine.

3. The machine of claim 1, wherein the tool further comprises a repair tool for performing a repair or maintenance task on the interior of the machine, wherein the repair or maintenance task comprises at least one of:

a grinding tool for grinding a blade tip;

a cleaning tool for cleaning an internal component;

a replacing tool for replacing a damaged internal component; and a repairing tool for repairing a damaged internal component.

4. The machine of claim 1, including wherein the tool is operable while the machine is offline, and the external casing remains in place.

5. The machine of claim 1, wherein the tool further comprises an inspection tool, the inspection tool including at least one of:

a measurement device for measuring at least one operating parameter, the at least one operating parameter being selected from the group consisting of: a displacement of a component, a temperature, a clearance gap between a stationary component and a rotating component, a pressure, a magnetic flux, a capacitance, a surface finish and a vibration;

a visual inspection tool for performing a visual inspection of a component; and a testing tool for testing for a presence of a deposit on a component.

6. The machine of claim 5, wherein the inspection tool is operable while the machine is in operation.

7. The machine of claim 5, wherein the inspection tool transmits inspection data to a computing device using at least one of a wired or a wireless data communication protocol.

8. The machine of claim 7, wherein the computing device analyzes the inspection data and performs calculations for at least one of:

generating a maintenance schedule;

generating an estimate of down time for the machine for any further inspection needed; and determining whether a repair or a replacement is necessary.

9. A device for monitoring a machine having an external casing, the device comprising:

a tool affixed to an access port device cover, wherein the access port device cover is removably affixed to the external casing, wherein the external casing includes an access port therethrough in a strategic location for providing access to a desired location on an interior of the machine, and further includes a removable cover for removably occluding and sealing the access port, wherein the tool is inserted into the desired location through the access port when the removable cover is removed, and wherein the access port device cover has a shape and a dimension that are substantially similar to that of the removable cover, wherein the tool further comprises a repair tool for performing a repair task at the desired location.

10. The device of claim 9, wherein the repair tool comprises at least one of:

a grinding tool for grinding a blade tip;

a cleaning tool for cleaning an internal component;

a replacing tool for replacing a damaged internal component; and a repairing tool for repairing a damaged internal component.

11. A device for monitoring a machine having an external casing, the device comprising:

a tool affixed to an access port device cover, wherein the access port device cover is removably affixed to the external casing, wherein the external casing includes an access port therethrough in a strategic location for providing access to a desired location on an interior of the machine, and further includes a removable cover for removably occluding and sealing the access port, wherein the tool is inserted into the desired location through the access port when the removable cover is removed, and wherein the access port device cover has a shape and a dimension that are substantially similar to that of the removable cover, wherein the tool further comprises a borescope for performing a visual inspection of a component, wherein the device is removably affixed to the external casing of the machine by at least one bolt having a bolt head keyed such that a mated tool of a non-standard size and a non-standard shape is required to remove the bolt, and wherein the access port device cover is interchangeably insertable into the access port with the removable cover and with at least one additional access port device cover comprising at least one other tool.

12. The device of claim 11, wherein the access port device cover sealably occludes the access port when inserted therein.

13. The device of claim 11, wherein the device is operable while the machine is offline.

14. The device of claim 11, wherein the machine includes a turbomachine, and the tool has a range of a plurality of stages of the turbomachine in each of a forward and an aft direction from the access port.

15. The device of claim 11, wherein the borescope is operable while the machine is in operation.

16. The device of claim 15, wherein the borescope transmits inspection data to a computing device using at least one of a wired or a wireless data communication protocol.

17. The device of claim 16, wherein the computing device analyzes the inspection data and performs calculations for at least one of:

generating a maintenance schedule;

generating an estimate of down time for the machine for any further inspection needed; and determining whether a repair or a replacement is necessary.

* * * * *